(No Model.) 2 Sheets—Sheet 1.

S. W. BUENCE & A. BASH.
SAW SET.

No. 481,221. Patented Aug. 23, 1892.

Witnesses:

Inventors:
S. W. Buence,
Ambrose Bash.
By Higdon & Higdon
Atty's.

(No Model.) 2 Sheets—Sheet 2.
S. W. BUENCE & A. BASH.
SAW SET.
No. 481,221. Patented Aug. 23, 1892.
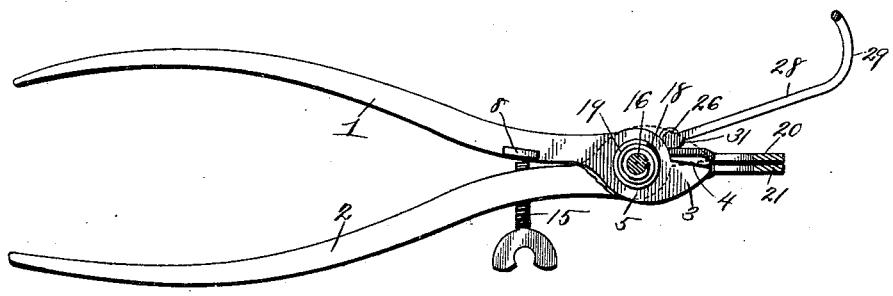
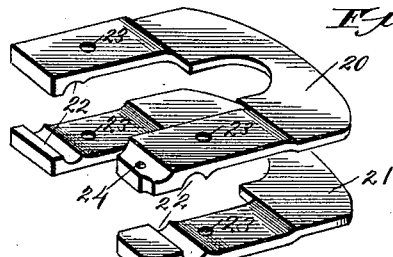
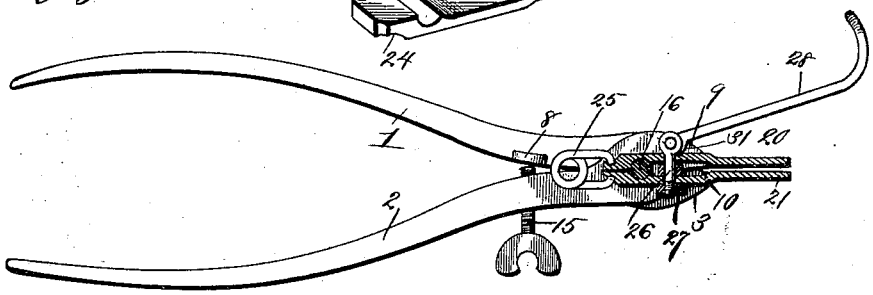
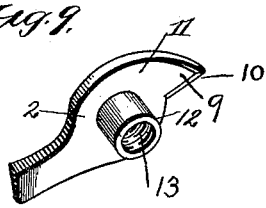 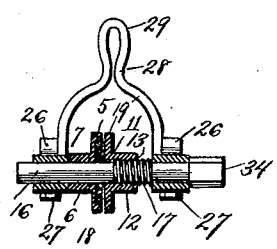
Witnesses:
G. S. Thorpe,
Jno. L. Condron
Inventors
S. W. Buence and
Ambrose Bash.
By Higdon & Higdon
Attys.

UNITED STATES PATENT OFFICE.

SAMUEL W. BUENCE, OF ARGENTINE, AND AMBROSE BASH, OF TURNER, KANSAS; SAID BUENCE ASSIGNOR TO GEORGE A. TAYLOR, OF ARGENTINE, KANSAS.

SAW-SET.

SPECIFICATION forming part of Letters Patent No. 481,221, dated August 23, 1892.

Application filed February 1, 1892. Serial No. 419,863. (No model.)

*To all whom it may concern:*

Be it known that we, SAMUEL W. BUENCE, of Argentine, and AMBROSE BASH, of Turner, Wyandotte county, Kansas, have invented certain new and useful Improvements in Hand Saw-Sets, of which the following is a full, clear, and exact description, reference being had to the accompanying drawings, forming a part hereof.

Our invention relates to that class of appliances which are designed to slant the teeth of saws laterally from the plane of the saw alternately in opposite directions, in order that the kerf or cut made by the saw shall be wider than the thickness of the saw-blade, and friction be thus reduced.

The objects of our invention are to produce a hand saw-setting implement which shall be simple, durable, and inexpensive in construction and effective in its operation, and the various adjustments of which can be readily and quickly effected; furthermore, to produce a hand saw-setting implement which, in addition to the advantages above enumerated, shall be adapted to set the teeth of a great variety of saws, and also to set the teeth of saws having different gages or, in other words, having a greater or less number of teeth in a given space.

To the above purposes our invention consists in certain peculiar and novel features of construction and arrangement, as hereinafter described and claimed.

In order that our invention may be fully understood, we will proceed to describe it with reference to the accompanying drawings, in which—

Figure 1:
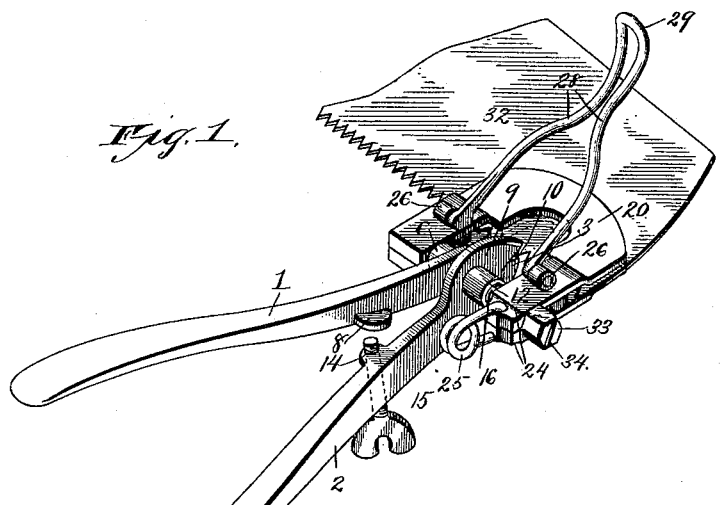
Figure 7:
Figure 2:
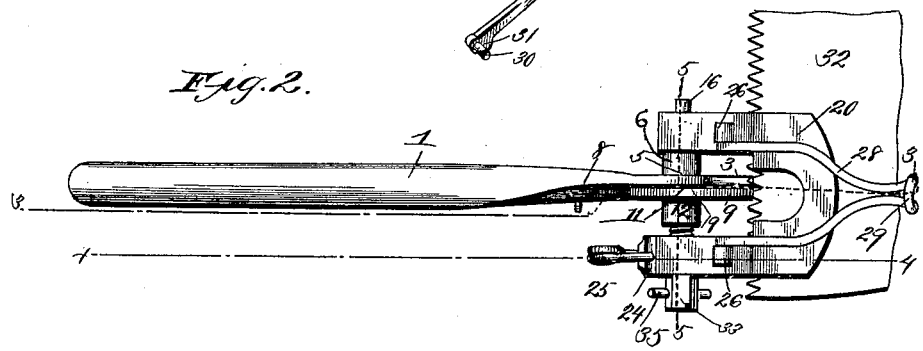
Figure 10:

Figure 1 is a perspective view of a saw-setting implement embodying our invention, the said implement being shown as applied to a portion of a saw. Fig. 2 is a plan view of the same. Fig. 3 is a vertical longitudinal section of the same on the line 3 3 of Fig. 2. Fig. 4 is a vertical longitudinal section of the same on the line 4 4 of Fig. 2. Fig. 5 is a transverse vertical section of the same on the line 5 5 of Fig. 2. Fig. 6 is a detached perspective view of the two clamping-yoke sections of the implement. Fig. 7 is a detached perspective view of the pivotal stirrup for operating the clamping-yoke. Fig. 8 is a detached perspective view of the outer or forward end of one of the operating-arms of the implement. Fig. 9 is a detached perspective view of the outer or forward end of the companion arm of the implement. Fig. 10 is a detached plan view of the main pivot-bolt of the saw-set.

In said drawings, 1 designates one of the operating handles or arms of the implement, and 2 the companion handle or arm, the said handles or arms being of iron, steel, or other suitable metal, or, if preferred, of wood or other suitable rigid material. In any event the rear or outer parts of these handles or arms preferably converge outwardly somewhat toward each other, as shown, and the arrangement being such that said handles or arms can be readily grasped in one of the operator's hands and drawn together or moved away from each other as the use of the implement may require. The opposite or front end of the handle or arm 1 is formed with a setting jaw or spur 3, which is of properly-tempered steel and which is preferably formed integrally with the handle or arm 1, as shown. This jaw or spur 3 is of approximately semicircular form at its outer margin, and its working face or edge 4 is of straight form and extends outwardly or forwardly in longitudinal alignment with the adjacent body portion of the arm or handle 1, the working face or edge 4 being presented inwardly and the segmental margin extending outwardly and rearwardly, as shown. This jaw or spur is formed integrally with a flat enlargement or hub 5, which is formed upon the front end of the arm or handle 1, and the outer margin of which is preferably of circular form, as shown. From the middle of the outer side of this enlargement 5 extends outwardly a short cylindrical boss 6, an opening 7 being formed through this boss and also through the hub or enlargement 5 for a purpose to be hereinafter explained. Just back of the enlargement 5 the arm or handle 1 is formed or otherwise provided with a stop or lug 8, which projects laterally toward and over the companion handle 2, for a purpose also to be hereinafter explained.

The outer or front end of the companion arm 2 is formed with a companion setting spur or jaw 9, which is also of properly-tempered steel and which is preferably formed integrally with the handle or arm 2, as shown. This tooth or spur 9 is of approximately semicircular form at its outer margin, and its working face or edge 10 is of straight form and extends outwardly or forwardly in longitudinal alignment with the adjacent body portion of the arm or handle 2, the working face or edge 10 being presented inwardly and the segmental margin extending outwardly and rearwardly, as shown. This jaw or spur is formed integrally with a flat enlargement or hub 11, which is formed upon the front end of the arm or handle 2, and the outer margin of which is preferably of circular form, as shown. From the middle of the outer side of this enlargement 11 extends outwardly a short cylindrical boss 12, an opening 13 being formed through this boss and also through the hub or enlargement 11, and said opening being furthermore internally screw-threaded, for a purpose to be hereinafter explained. Just back of the enlargement 11 of the arm or handle 2 is formed or otherwise provided an offset 14, which projects laterally toward and beneath the arm or handle 1. This offset 14 is formed with a transverse internally-screw-threaded opening, through which works the externally-screw-threaded stem of an adjusting-screw 15, which comes at times into contact with the lug or stop 8, and thus limits the closing movements of the implement, as hereinafter fully explained.

16 (see Fig. 10) designates the pivot pin or bolt of the implement, this pin or bolt passing through the openings 7 and 13 of the bosses 6 and 12. The surface of the opening of the hub 5 is perfectly smooth or plain, while the surface of the opening of the hub 11 is internally screw-threaded, as above stated. The pivot pin or bolt 16 is formed with an external screw-thread 17, which engages the said internal screw-thread of the opening 13, for a purpose to be hereinafter explained. The cylindrical bosses 6 and 12 extend oppositely from each other and from the outer sides of the enlargements 5 and 11, as stated, and the inner side or surface of the enlargement 5 is formed with a recess 18, the margin of which is of circular contour and concentric with the axis of the opening 7 through said enlargement. In this recess is inserted one end portion of a helical expansively-acting spring 19, which surrounds the pivot pin or bolt 16, and the opposite end of which impinges against the inner side or surface of the enlargement 11 of the companion arm 2, this inner surface or side being preferably left perfectly plain or flat. The tendency of the spring 19 is thus to force the two arms and their jaws or spurs away from each other, while the pivot pin or bolt 16 when turned in one direction moves the jaws or spurs toward each other, and when turned in the opposite direction permits the spring 19 to force the jaws or spurs away from each other, as hereinafter more fully described, and for the purpose hereinafter explained.

20 and 21 designate the two sections of the clamping-yoke of the implement, these two sections or members being each of approximately U form and preferably of suitable metal. The inner surface of the extremity of each arm of each of these yoke-sections is formed with a transversely-extending semicircular groove 22, there being thus four of these grooves disposed in two opposite pairs, and each pair of said grooves embraces the corresponding end portion of the pivot pin or bolt 16. Furthermore, through each arm of each yoke-section is formed an opening or hole 23, there being thus four of said openings or holes disposed in two oppositely-arranged pairs, for a purpose to be hereinafter explained. Two of the opposite arms of the two yoke-sections 20 are each formed with a transverse groove 24, which grooves are formed upon the outer surfaces of said arms at their outer extremities, the said grooves 24 thus being located opposite from each other. Within these two grooves 24 are inserted the extremities of a spring 25, the middle or body portion of which is formed in two or more convolutions, and the action of the spring being to draw its extremities toward each other and consequently press the inner parts of the yoke together and their outer parts or bends away from each other, the bolt 16 serving as the pivot for such movement. Through the openings or holes 23 extend two bolts 26, each of which is formed with an open head or eye at one end and the opposite end of each of which is externally screw-threaded to receive a nut 27, the said nuts impinging upon the outer surface of the opposite yoke-section from that adjacent to which the eyes or open heads of the bolts protrude.

28 designates a stirrup, which is preferably formed of a piece of sufficiently stout and resilient wire. This stirrup is of approximately U form, the wire at its middle portion being turned also upward, as at 29, to form a thumb piece or rest for operating the stirrup. Owing to the resilience of the wire of which the stirrup is composed, the extremities of the stirrup have a tendency to spring away from each other. Each of these extremities is formed with an outwardly-extending trunnion 30, which when the stirrup is in proper operative position each enter one of the open heads or eyes of the bolts 26. The under sides of these extremities of the stirrup are each formed with an eccentric or cam section 31, as shown.

The operation of the above-described implement is as follows: Let 32 designate a saw. Before using the implement the pivot pin or bolt 16 is turned either in one direction or the other, so as to cause the jaws or spurs 3 and 10 to move away from or to approach each other, in order that when the implement is applied to the saw one of the teeth shall come into contact with one side of one saw-tooth and the other jaw or spur shall come into contact with the opposite side of the next adjacent saw-tooth. The bolt or pin is provided at one end with an angular head 33 to receive a suitable wrench or spanner for turning the pin or bolt, as described, and said head is shown as provided at its outer end with a nick 34 to receive a screw-driver blade for the same purpose. The head is also shown as provided with a cross pin or bar 35, which may be grasped by the operator's fingers when he desires to so turn the pin or bolt for adjusting the setting jaws or spurs, as just explained. The nuts 27 on the bolts 26 are now turned in one or the opposite direction, so as to open or close the yoke members 20, in order to separate them a distance somewhat greater than the thickness of the saw-blade. The saw-blade is now embraced by the yoke-sections, so as to bring the setting jaws or spurs against opposite sides of the points of the saw-teeth, and the stirrup 28 is swung forward, so as to bring its cams 31 against the surface of the adjacent yoke member, and thus draw said members together, so that they shall firmly clasp the saw-blade. The handles or arms 1 and 2 are now grasped in one of the operator's hands, so as to be moved toward each other, the setting spurs or jaws of the implement being likewise drawn toward each other. This movement of the setting spurs or jaws bends the point of one saw-tooth laterally in one direction and the point of the next succeeding saw-tooth laterally in the opposite direction, so as to properly set the teeth. The screw 15 is first turned so as to strike the stop 8 at the proper time, and thus limit the movement of the setting spurs or jaws to effect precisely the desired setting or bending of the points of the saw-teeth. After two of the saw-teeth have thus been set the stirrup is thrown backward and the implement is moved along till its setting spurs or jaws engage the next two saw-teeth, after which the above-described operations are repeated.

It will thus be seen that the implement is simple, durable, and inexpensive in construction, readily adjusted and manipulated, rapid and effective in its operation, and capable of application to a great variety of saws.

Having thus described our invention, what we claim as new therein, and desire to secure by Letters Patent, is—

1. A hand saw-setting implement comprising a pair of pivotal movable handles or arms having each a setting spur or jaw, a pivot bolt or pin extending through said arms, a pair of clamping-yoke sections pivoted upon the bolt or pin and provided with a separating-spring, and a stirrup adjustably connected to said yoke members and having eccentric portions for engaging one of the said members and drawing said members toward each other, substantially as set forth.

2. A hand saw-setting implement comprising a pair of pivotally-connected handles or arms, each having a setting jaw or spur, a pivot pin or bolt passing through said arms, a pair of clamping-yoke members pivotally connected to said bolt or pin, a spring for separating said yoke members, a pair of bolts passing transversely through said yoke members, and a stirrup connected to the heads of said bolts and having eccentric ends for engaging one of the yoke members and drawing said members toward each other, substantially as set forth.

In testimony whereof we affix our signatures in the presence of two witnesses.

SAMUEL W. BUENCE.
    AMBROSE BASH.

Witnesses:
 JNO. L. CONDRON,
 GEO. THORPE.